Dec. 29, 1925.
R. D. EVANS ET AL
1,567,582
UNBALANCED FACTOR METER
Filed Sept. 16, 1921
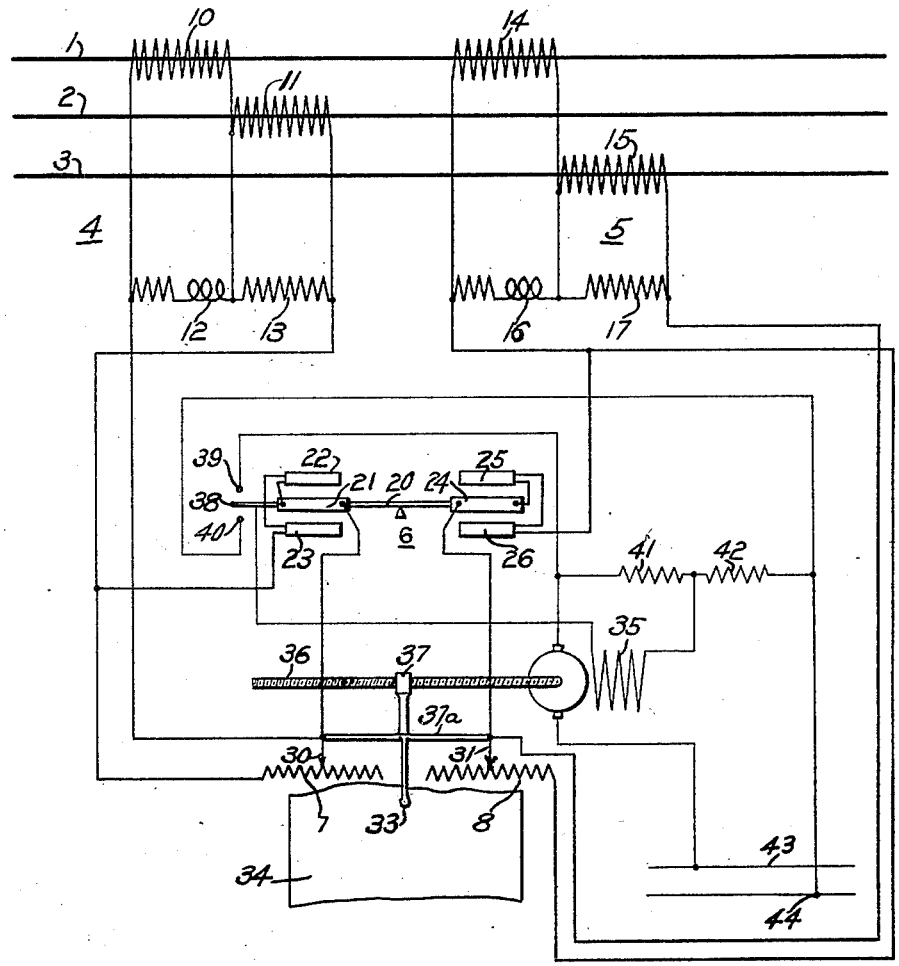
WITNESSES:
INVENTORS
Robert D. Evans. and
Raymond T. Pierce.
BY
ATTORNEY Patented Dec. 29, 1925.

1,567,582

UNITED STATES PATENT OFFICE.

ROBERT D. EVANS, OF PITTSBURGH, AND RAYMOND T. PIERCE, OF WILKINSBURG, PENNSYLVANIA, ASSIGNORS TO WESTINGHOUSE ELECTRIC & MANUFACTURING COMPANY, A CORPORATION OF PENNSYLVANIA.

UNBALANCED FACTOR METER.

Application filed September 16, 1921. Serial No. 501,078.

*To all whom it may concern:*

Be it known that we, ROBERT D. EVANS, a citizen of the United States, and a resident of Pittsburgh, in the county of Allegheny and State of Pennsylvania, and RAYMOND T. PIERCE, a citizen of the United States, and a resident of Wilkinsburg, in the county of Allegheny and State of Pennsylvania, have invented a new and useful Improvement in Unbalanced Factor Meters, of which the following is a specification.

Our invention relates to measuring devices and systems and it has special relation to measurement of the symmetrical components or factors into which an unbalanced quantity of an electrical circuit may be resolved.

In practicing our invention we utilize the broad principles of indicating the symmetrical components of the unbalanced quantities of an electrical system that are disclosed in the co-pending application of Charles Le G. Fortescue, Lewis W. Chubb and Joseph Slepian, Serial No. 358,373, filed February 13, 1920, Patent No. 1,535,593, granted April 28, 1925, and also in the co-pending application of Chester T. Allcutt, Serial No. 370,229, filed March 31, 1920, both applications being assigned to the Westinghouse Electric & Manufacturing Company.

It has been discovered that any unbalanced polyphase system of electrical quantities, for instance, currents or voltages, may be resolved into two or more symmetrical systems. These quantities, for example, may be resolved into a positive-phase-sequence component, a negative-phase-sequence component and a zero-phase-sequence component. In a three-phase, three-wire system the zero-phase-sequence component is of zero value and only the positive and the negative-phase-sequence components need be considered.

In the former application, referred to above, a general method and system of apparatus for segregating either of the phase-sequence components of one of the electrical quantities is described and claimed.

In the latter application, referred to above, is described and claimed a method and apparatus for segregating one of the components by stationary resistors and reactors having predetermined relative characteristics.

One object of our invention is to provide an instrument of the Kelvin balance type embodying the principles set forth above and that is particularly adapted for use in a graphic type of meter.

More specifically stated, it is the object of our invention to provide a Kelvin balance, the respective sets of coils of which are energized in accordance with a positive-phase-sequence component and a negative-phase-sequence component of the supply-circuit current, together with means for varying the current in one coil oppositely to that in the other.

Our invention may best be understood by reference to the accompanying drawing, the single figure of which is a diagrammatic view of a measuring system organized in accordance with our present invention.

Referring to the drawing, the system here shown comprises a plurality of supply-circuit conductors 1, 2 and 3, upon which is impressed an unbalanced voltage, or in which an unbalanced load causes an unbalanced current to traverse the circuit. A positive-phase-sequence producing system 4 and a negative-phase-sequence producing system 5 are associated with the respective sets of coils of a Kelvin balance 6. A plurality of adjustable resistors 7 and 8 are provided in connection with the respective sets of coils, as hereinafter more fully set forth.

The positive-phase-sequence network 4 comprises a plurality of secondary windings 10 and 11 of current transformers that are respectively associated with the supply-circuit conductors 1 and 2 and have a common middle connection. A combined resistor and reactor or reactive impedance 12 is connected across the terminals of the secondary winding 10 and a resistor 13 of equal absolute value is connected across the terminals of the other secondary winding 11. The arrangement of parts, including the secondary windings 10 and 11 and the devices 12 and 13, is such that a voltage proportional to the positive-phase-sequence component of current is produced at the terminals of the network 4, in accordance with the principles set forth in the above-identified co-pending applications.

With this arrangement, the impedance device 12 has a voltage impressed thereupon, that is proportional to the current traversing the conductor 1, whereas the resistor 13 has a voltage impressed thereupon that is proportional to the current traversing the conductor 2 and is therefore equal to that across the device 12 under balanced conditions.

The impedance device 12 is of such character that the current traversing the same lags the impressed voltage by 60°, so that the voltage is exactly in phase under balanced conditions with that impressed across the resistor 13. Accordingly a voltage that is proportional to the positive-phase-sequence component, is produced at the terminals of the network 4.

On the other hand, the negative-phase-sequence system 5 comprises a plurality of secondary windings 14 and 15 of current transformers which are respectively associated with supply-circuit conductors 1 and 3.

A combined resistor and reactor or reactive impedance 16 is connected across the terminals of the secondary winding 14, while a resistor 17 of equal absolute value is connected across the terminals of the secondary winding 15.

In the present instance, the use of the supply-circuit conductor 3 in lieu of the conductor 2 that is employed in connection with the positive-phase-sequence system 4 so reverses the phase relations within the system 5 that the voltages across the impedances 16 and 17 are exactly opposite in phase under balanced conditions and a voltage proportional to the desired negative-sequence component of the unbalanced load current is produced at the terminals of the network.

The Kelvin balance 6 is of well-known general construction, comprising a suitably fulcrumed balancing member 20, upon one end of which is disposed a movable coil 21 that is adapted to oscillate between a pair of stationary co-operative coils 22 and 23. All three coils are connected in series relation across the terminals of the positive-phase-sequence instrument 4 and, consequently, the corresponding coils of the Kelvin balance 6 are energized in accordance with the positive-phase-sequence component or factor of the unbalanced load in the supply circuit.

The other end of the balancing lever 20 is provided with a movable coil 24 which co-operates with a pair of stationary coils 25 and 26, the three coils being connected in series relation across the terminals of the negative-phase-sequence device 5.

The last-named coils, therefore, are energized in accordance with the negative-phase-sequence component or factor of the unbalanced current conditions in the supply circuit.

In order to transmit movement of the balance lever 20 in the one or the other direction to a pen or stylus 33 adapted to co-operate with a chart 34, a pilot motor 35 is associated with the balancing lever 20, in a manner to be set forth, to effect rotation of a worm shaft 36 upon which is mounted a traveling nut 37. A rod or insulating bar 37ª is suitably attached to the traveling nut 37 and the ends of the bar are provided with suitable pointers or rheostat arms 30 and 31.

To control the pilot motor 35, a movable contact member or finger 38 is suitably attached to the coil 21. A plurality of stationary terminals or contact members 39 and 40 are located on opposite sides of the finger 38 to be respectively engaged thereby in the one or the other extreme position of the movable coil.

Co-operating with the contact members 38, 39 and 40 are a plurality of resistors 41 and 42 which are connected through the armature of the pilot motor across a suitable direct current supply circuit comprising conductors 43 and 44. The terminals of the pilot motor field winding are respectively connected to the movable finger 38 and the junction-point of the resistors 41 and 42.

Since the illustrated pilot motor connections are familiar to those skilled in the art, no detailed description thereof or of the pilot motor operation is deemed necessary.

It will be sufficient to state that movement of the coil 21 in the upward direction to effect contact with the terminal 39 produces movement of the pilot motor in the one direction, while the opposite direction of motor movement is obtained through contact with the lower terminal 40. Such energization of the pilot motor effects a corresponding degree of movement of the traveling nut 37 and, therefore, of the pen 33 until the proper variation of the resistors 7 and 8 occurs, one of which is increasingly included in circuit whenever the other is gradually excluded from circuit. As soon as the variation of the resistors 7 and 8 is sufficient to counteract the initial change of current values that produced movement of the balance, the balance returns to its illustrated normal or open-circuit position, although, of course, the pen 33 remains in the position to which it was moved until another actuation of the Kelvin balance produces further energization of the pilot motor to actuate the pen 33 in the one or the other direction.

The pointer or arm 30 is thus adapted to move along the resistor 7 to gradually increase or decrease the amount of resistance that is shunted across the balance coils 21, 22 and 23, while the other pointer 31 is adapted to perform a similar function with respect to the resistor 8 and the remaining coils 24, 25 and 26.

The active value of the resistor 7 will be decreased in the event of a movement of the Kelvin balance in the one direction, corresponding to a certain variation in the ratio between the positive and the negative-phase-sequence components of the currents traversing the conductors 1, 2 and 3. By reason of the rigid mechanical connection of the pointers or arms 30 and 31, the resistance of the other resistor 8 will be increased simultaneously with the decrease of the resistance of the resistor 7. In this way, the value of the current traversing the coils 21, 22 and 23 will be decreased at the same time that the current traversing the remaining coils of the balance will be increased, to thus restore the magnetic balance of the apparatus corresponding to the original conditions. The stylus 33 is thereby given a corresponding and definite displacement, although the balance coils 21 return to the normal condition, as previously mentioned.

The application of the illustrated apparatus to the graphic type of meter will be readily apparent to those skilled in the art. For example, if a roll of paper or record sheet 34 travels adjacent the balance 6, the pen or stylus 33 will be actuated towards the right or to the left, in accordance with the degree and type of unbalance in the supply circuit. Consequently, the resultant wavy line delineated upon the traveling paper will furnish a permanent and continuous record of the degree of unbalance of the symmetrical components or factors of the unbalanced load conditions in the supply circuit.

It will be seen that we have thus provided a Kelvin-balance type of meter that is particularly adapted for recording, the respective elements or coils of which are energized in accordance with the positive-phase-sequence and the negative-phase-sequence components of the unbalanced load conditions in a supply circuit.

Although we have illustrated and described our invention in connection with a three-phase supply circuit only, it will be evident that the principles of the invention may be readily applied to other types of polyphase circuits.

Consequently, we do not wish to be restricted to the specific circuit connections or arrangements of parts herein set forth, as various modifications thereof may be made without departing from the spirit and scope of our invention. We desire, therefore, that only such limitations shall be imposed as are indicated in the appended claims.

We claim as our invention:

1. A measuring device for a polyphase circuit comprising means for producing different symmetrical components of an unbalanced quantity, a balancing relay and means for applying said components to different elements of said relay.

2. A measuring device for a polyphase circuit comprising means for producing different symmetrical components of an unbalanced quantity, a Kelvin relay and means for applying said components to opposing coils of said relay.

3. A measuring device for a polyphase circuit comprising means for producing a positive-phase-sequence and a negative-phase-sequence component of the unbalanced current of said circuit, a balancing relay and means for applying said components to different elements of said relay.

4. A measuring device for a polyphase circuit comprising means for producing a positive-phase-sequence and a negative-phase-sequence component of the unbalanced current of said circuit, a Kelvin relay and means for applying said components to opposing coils of said relay.

5. A measuring device for a polyphase unbalanced circuit comprising a balancing relay and means for impressing upon said relay a plurality of components of the set of symmetrical components into which the unbalanced quantities of the circuit may be resolved, said means comprising resistors and reactors to be connected between said circuit and said relay, and having such characteristics as to segregate predetermined symmetrical components and impress them upon the relay.

6. A measuring device for a polyphase unbalanced circuit comprising a Kelvin balance and means for impressing upon said balance a positive-phase-sequence and a negative-phase-sequence component of the unbalanced current traversing the circuit, said means comprising resistance and reactance devices associated with the coils of said balance and having such characteristics and being so connected to said circuit as to produce the desired components.

7. A measuring device for a polyphase circuit comprising means for producing different symmetrical components of an unbalanced quantity, a balancing relay, means for applying said components to different elements of said relay and means for varying the effectiveness of said elements.

8. A measuring device for a polyphase circuit comprising means for producing different symmetrical components of an unbalanced quantity, a Kelvin relay, means for applying said components to opposing coils of said relay and means for adjustably shunting said coils.

9. A measuring device for a polyphase circuit comprising means for producing different symmetrical components of an unbalanced quantity, a balancing relay, means for applying said components to different elements of said relay and means responsive to the relay movements for varying the effectiveness of said elements.

10. A measuring device for a polyphase circuit comprising means for producing different symmetrical components of an unbalanced quantity, a Kelvin relay, means for applying said components to opposing coils of said relay and means dependent upon the movements of said relay for adjustably shunting said coils.

11. A measuring device for a polyphase circuit comprising means for segregating the symmetrical components of an unbalanced quantity of the circuit, a Kelvin balance, means for applying said components to opposing coils of said balance and means responsive to the movements of said balance to restore the same to its normal position.

In testimony whereof, we have hereunto subscribed our names this 6th day of September, 1921.

ROBERT D. EVANS.
RAYMOND T. PIERCE.